(12) United States Patent  
Albero et al.

(10) Patent No.: US 12,554,806 B2
(45) Date of Patent: Feb. 17, 2026

(54) DIGITAL WATERMARKING FOR AUTOMATED VISHING PREVENTION (71) Applicant: Bank of America Corporation, Charlotte, NC (US)

(72) Inventors: George Albero, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/368,085

(22) Filed: Sep. 14, 2023

(65) Prior Publication Data

US 2025/0094544 A1 Mar. 20, 2025

(51) Int. Cl.
*G06F 21/16* (2013.01)
*G06F 21/10* (2013.01)
*G10L 19/018* (2013.01)
*H04L 12/18* (2006.01)
*H04N 7/14* (2006.01)
*H04N 21/845* (2011.01)

(52) U.S. Cl.
CPC .......... *G06F 21/16* (2013.01); *G06F 21/1015* (2023.08); *G10L 19/018* (2013.01); *H04L 12/1813* (2013.01); *H04N 7/147* (2013.01); *H04N 21/8456* (2013.01)

(58) Field of Classification Search
CPC ... G06F 21/16; G06F 21/1015; G10L 19/018; H04L 12/1813; H04N 7/147; H04N 21/8456

See application file for complete search history.

(56) References Cited

U.S. PATENT DOCUMENTS

| | | | | |
|---|---|---|---|---|
| 6,571,284 B1 * | 5/2003 | Suonvieri | ............... | H04B 7/155 370/246 |
| 8,856,640 B1 * | 10/2014 | Barr | ........................ | G06F 21/31 715/255 |
| 9,197,746 B2 | 11/2015 | Kurapati et al. | | |
| 9,800,952 B2 * | 10/2017 | An | ..................... | H04N 21/4126 |
| 9,961,197 B2 | 5/2018 | Kurapati et al. | | |

(Continued)

FOREIGN PATENT DOCUMENTS

JP H11296200 A * 10/1999

*Primary Examiner* — William R Korzuch
*Assistant Examiner* — Aditya Sriram
(74) *Attorney, Agent, or Firm* — Banner & Witcoff, Ltd.

(57) ABSTRACT

A computing platform may generate a digital watermark configured to verify an identity of an initiator of a communication session. The computing platform may send, to a first user device, a digital watermark signal, where the digital watermark signal indicates: a validated digital watermark comprising the digital watermark, and a first frequency at which the digital watermark is embedded. The computing platform may embed, into a request to initiate a communication session, the digital watermark. The computing platform may send, to the first user device, the request to initiate the communication session, where the first user device may be configured to: 1) identify, based on the first frequency, the digital watermark, 2) compare the digital watermark to the validated digital watermark, and 3) based on identifying that the digital watermark matches the validated digital watermark, output an authenticated communication session notification.

19 Claims, 7 Drawing Sheets (56) References Cited

U.S. PATENT DOCUMENTS

| | | | |
|---|---|---|---|
| 10,237,302 B1 | 3/2019 | Kras et al. | |
| 10,701,106 B2 | 6/2020 | Kras et al. | |
| 10,970,394 B2 | 4/2021 | Kedem et al. | |
| 11,032,415 B1 * | 6/2021 | Retnamma | G06F 21/64 |
| 11,240,272 B2 | 2/2022 | Albero et al. | |
| 11,423,926 B2 | 8/2022 | Enzinger et al. | |
| 11,425,563 B2 | 8/2022 | Turgeman et al. | |
| 11,457,041 B2 | 9/2022 | Kras et al. | |
| 11,606,353 B2 | 3/2023 | Zaloum et al. | |
| 12,314,990 B2 * | 5/2025 | Rohatgi | G06Q 30/0613 |
| 2004/0160986 A1 * | 8/2004 | Perlman | H04L 63/0428 |
| | | | 370/480 |
| 2009/0217039 A1 | 8/2009 | Kurapati et al. | |
| 2015/0124945 A1 | 5/2015 | Kurapati et al. | |
| 2016/0021435 A1 * | 1/2016 | Topchy | G08C 23/02 |
| | | | 340/870.3 |
| 2016/0165449 A1 * | 6/2016 | Poisner | H04W 12/12 |
| | | | 726/4 |
| 2019/0156034 A1 | 5/2019 | Kedem et al. | |
| 2019/0158535 A1 | 5/2019 | Kedem et al. | |
| 2019/0297110 A1 | 9/2019 | Kras et al. | |
| 2020/0036543 A1 * | 1/2020 | Suhail | H04N 7/147 |
| 2020/0052876 A1 * | 2/2020 | Kilian | H04L 9/3247 |
| 2020/0244452 A1 * | 7/2020 | Lacava | H04L 63/0861 |
| 2020/0266996 A1 * | 8/2020 | Carrott | H04L 63/0838 |
| 2020/0296133 A1 | 9/2020 | Kras et al. | |
| 2021/0193174 A1 | 6/2021 | Enzinger et al. | |
| 2021/0329030 A1 | 10/2021 | Kedem et al. | |
| 2023/0096899 A1 | 3/2023 | Smith-Rose et al. | |

* cited by examiner

Authenticated Call Notification

Incoming call from "Phone Number #1"

This call has been authenticated.

Unauthenticated Call Notification

Incoming call from "Phone Number #1"

This call has not been authenticated.

FIG. 6

DIGITAL WATERMARKING FOR AUTOMATED VISHING PREVENTION

BACKGROUND

In some instances, enterprise organizations, such as financial institutions, merchants, service providers, and/or other enterprises, may provide service to their customers and/or clients. In some instances, these services may be provided through voice communication between individuals (e.g., customer service calls, or the like). Such communication may include confidential information, personal identifiable information, and/or other information that may be private to an individual on the call (e.g., a client, or the like). As lifelike chatbots, deepfakes, and/or other voice simulators become more prevalent and accurate, they may augment the problem of automated vishing. For example, such impersonation/simulation may result in the unintended sharing of private and/or other confidential information with unauthorized parties. Accordingly, it may be important to provide enhanced security mechanisms to detect and/or otherwise prevent vishing attacks.

SUMMARY

Aspects of the disclosure provide effective, efficient, scalable, and convenient technical solutions that address and overcome the technical problems associated with authentication and impersonation detection. In one or more instances, a computing platform having at least one processor, a communication interface, and memory may generate a digital watermark configured to verify an identity of an initiator of a communication session. The computing platform may send, to a first user device, a digital watermark signal, which may indicate a validated digital watermark comprising the digital watermark, and a first frequency at which the digital watermark is embedded. The computing platform may embed, into a request to initiate a communication session, the digital watermark. The computing platform may send, to the first user device, the request to initiate the communication session, where the first user device may be configured to: identify, based on the first frequency, the digital watermark, compare the digital watermark to the validated digital watermark, and based on identifying that the digital watermark matches the validated digital watermark, output an authenticated communication session notification.

In one or more instances, the digital watermark may be one or more of: an audio signal, a number, or a hash value. In one or more instances, the digital watermark may be specific to a user of the first user device.

In one or more examples, the digital watermark may have a predetermined time to live (TTL). In one or more examples, the digital watermark may be configured for one time use.

In one or more instances, the digital watermark signal may further include a frequency band of the first frequency. In one or more instances, sending the request to initiate the communication session may include sending, via a plurality of intervening waypoints, the request to initiate the communication session, where a frequency at which the digital watermark is embedded may be modified at one or more of the plurality of intervening waypoints, and where the first frequency may correspond to a frequency at which the digital watermark is embedded at a final waypoint of the plurality of intervening waypoints.

In one or more examples, embedding the digital watermark may include embedding the digital watermark at the first frequency. In one or more examples, embedding the digital watermark may include embedding a first portion of the digital watermark at the first frequency and a second portion of the digital watermark at a second frequency, where the digital watermark signal further may include the second frequency.

In one or more instances, sending the request to initiate the communication session may include sending a first portion of the digital watermark at a first time and a second portion of the digital watermark at a second time, where the first user device may be configured to assemble the digital watermark, using the first portion of the digital watermark and the second portion of the digital watermark, once both portions of the digital watermark are received. In one or more instances, identifying the digital watermark may include performing frequency modulation at the first frequency and within a frequency band corresponding to the first frequency to detect the digital watermark.

In one or more examples, the computing platform may generate, after sending the request to initiate the communication session, a second digital watermark. The computing platform may replace the digital watermark with the second digital watermark.

In one or more instances, the first user device may be configured to: 1) receive, from a second user device, a request to initiate a second communication session, 2) identify that the request to initiate the second communication session does not include the digital watermark, and 3) based on identifying that the request to initiate the second communication session does not include the digital watermark, trigger presentation of an unauthenticated communication session notification. In one or more instances, triggering presentation of the unauthenticated communication notification may include triggering the first user device to perform one or more of: initiate haptic feedback, or modify a color of a display screen of the first user device. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for embedding digital watermarks for automated vishing prevention are described herein. For example, digital audio watermarks may be embedded within voice calls. These watermarks may be created by high frequency signals (e.g., 30-50 KHz, or the like), that may be transmitted through regular land networks, mobile networks, or the like, but might not be perceptible to human ears. These watermarks may be created by a pattern of such frequencies, and may be recognized by using digital signal processing at the receiving end, by a phone company, or the like. In some instances, conversations may be end to end encrypted so that some listeners might not be able to determine the watermarks by frequency filtering. In some instances, voice calls lacking a watermark may be automatically blocked. In some instances, the frequencies may hop within the system.

Figure 1A:
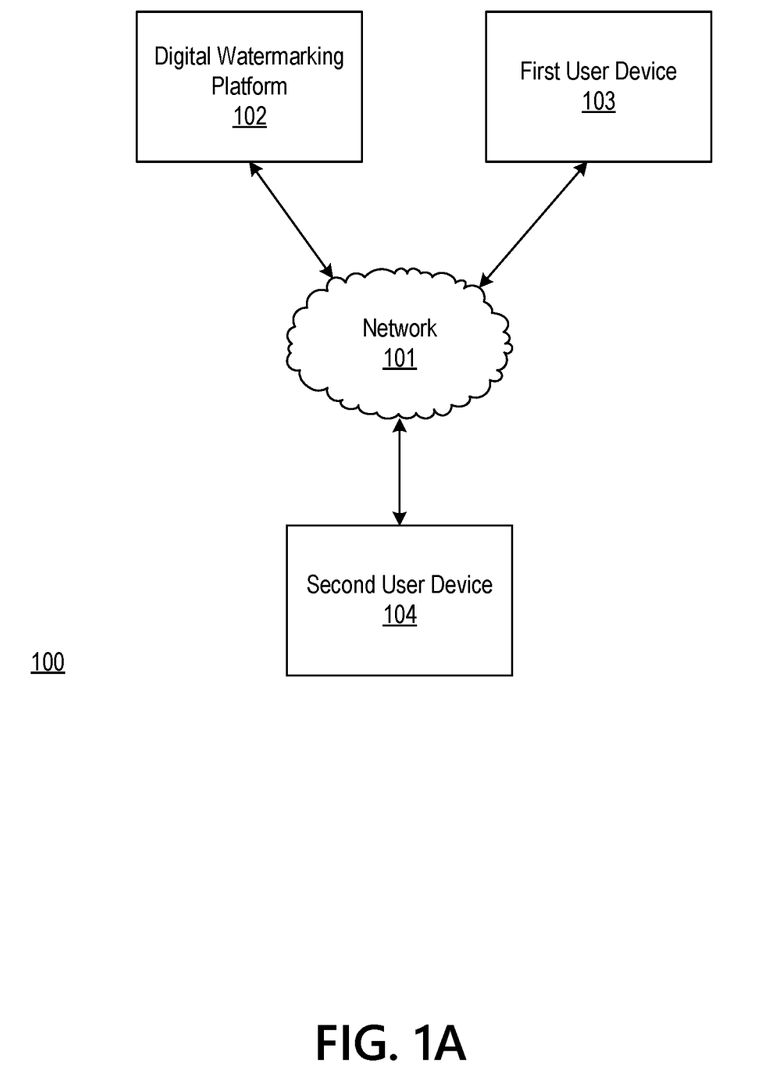
FIGS. 1A-1B depict an illustrative computing environment for embedding digital watermarks for automated vishing prevention in accordance with one or more example embodiments.
Figure 1B:
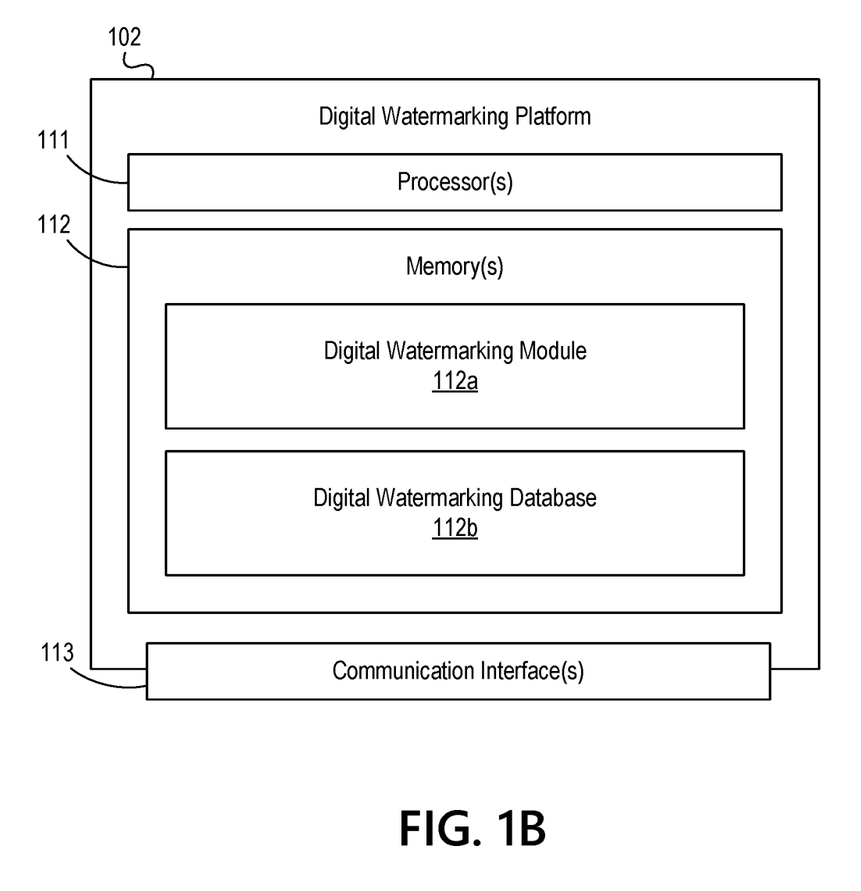

FIGS. 1A-1B depict an illustrative computing environment for embedding digital watermarks for automated vishing prevention in accordance with one or more example embodiments. Referring to FIG. 1A, computing environment 100 may include one or more computer systems. For example, computing environment 100 may include digital watermarking platform 102, first user device 103, and second user device 104.

As described further below, digital watermarking platform 102 may be a computer system that includes one or more computing devices (e.g., servers, server blades, or the like) and/or other computer components (e.g., processors, memories, communication interfaces) that may be used to provide automated vishing prevention services. For example, digital watermarking platform 102 may be configured to generate and embed digital watermarks into voice communication requests/sessions, which may be used to validate an identity of a caller.

First user device 103 may be and/or otherwise include a laptop computer, desktop computer, mobile device, tablet, smartphone, and/or other device that may be used by an individual (such as a client/customer of an enterprise organization). In some instances, the first user device 103 may be configured with an application (e.g., corresponding to the enterprise organization, or another enterprise organization), which may be configured to verify digital watermarks in received communication requests and/or established communication sessions. In some instances, first user device 103 may be configured to display one or more user interfaces (e.g., authenticated call notifications, unauthenticated call notifications, or the like).

Second user device 104 may be and/or otherwise include a laptop computer, desktop computer, mobile device, tablet, smartphone, and/or other device that may be used by an individual (who, for illustrative purposes, may be using a chatbot, deepfake, and/or otherwise simulating/impersonating a legitimate employee of an enterprise organization).

Although a single digital watermarking platform 102 and two user devices (first user device 103 and second user device 104) are shown, any number of such devices may be deployed in the systems/methods described below without departing from the scope of the disclosure.

Computing environment 100 also may include one or more networks, which may interconnect digital watermarking platform 102, first user device 103, second user device 104, or the like. For example, computing environment 100 may include a network 101 (which may interconnect, e.g., digital watermarking platform 102, first user device 103, second user device 104, or the like).

In one or more arrangements, digital watermarking platform 102, first user device 103, second user device 104 may be any type of computing device capable of sending and/or receiving requests and processing the requests accordingly. For example, digital watermarking platform 102, first user device 103, second user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of digital watermarking platform 102, first user device 103, second user device 104 may, in some instances, be special-purpose computing devices configured to perform specific functions.

Referring to FIG. 1B, digital watermarking platform 102 may include one or more processors 111, memory 112, and communication interface 113. A data bus may interconnect processor 111, memory 112, and communication interface 113. Communication interface 113 may be a network interface configured to support communication between digital watermarking platform 102 and one or more networks (e.g., network 101, or the like). Memory 112 may include one or more program modules having instructions that when executed by processor 111 cause digital watermarking platform 102 to perform one or more functions described herein and/or one or more databases that may store and/or otherwise maintain information which may be used by such program modules and/or processor 111. In some instances, the one or more program modules and/or databases may be stored by and/or maintained in different memory units of digital watermarking platform 102 and/or by different computing devices that may form and/or otherwise make up digital watermarking platform 102. For example, memory 112 may have, host, store, and/or include digital watermarking module 112a and/or digital watermarking database 112b.

Digital watermarking module 112a may have instructions that direct and/or cause digital watermarking platform 102 to provide improved vishing prevention techniques, as discussed in greater detail below. Digital watermarking database 112b may store information used by digital watermarking module 112a and/or digital watermarking platform 102 in application of advanced techniques to provide improved vishing prevention services, and/or in performing other functions.

Figure 2A:
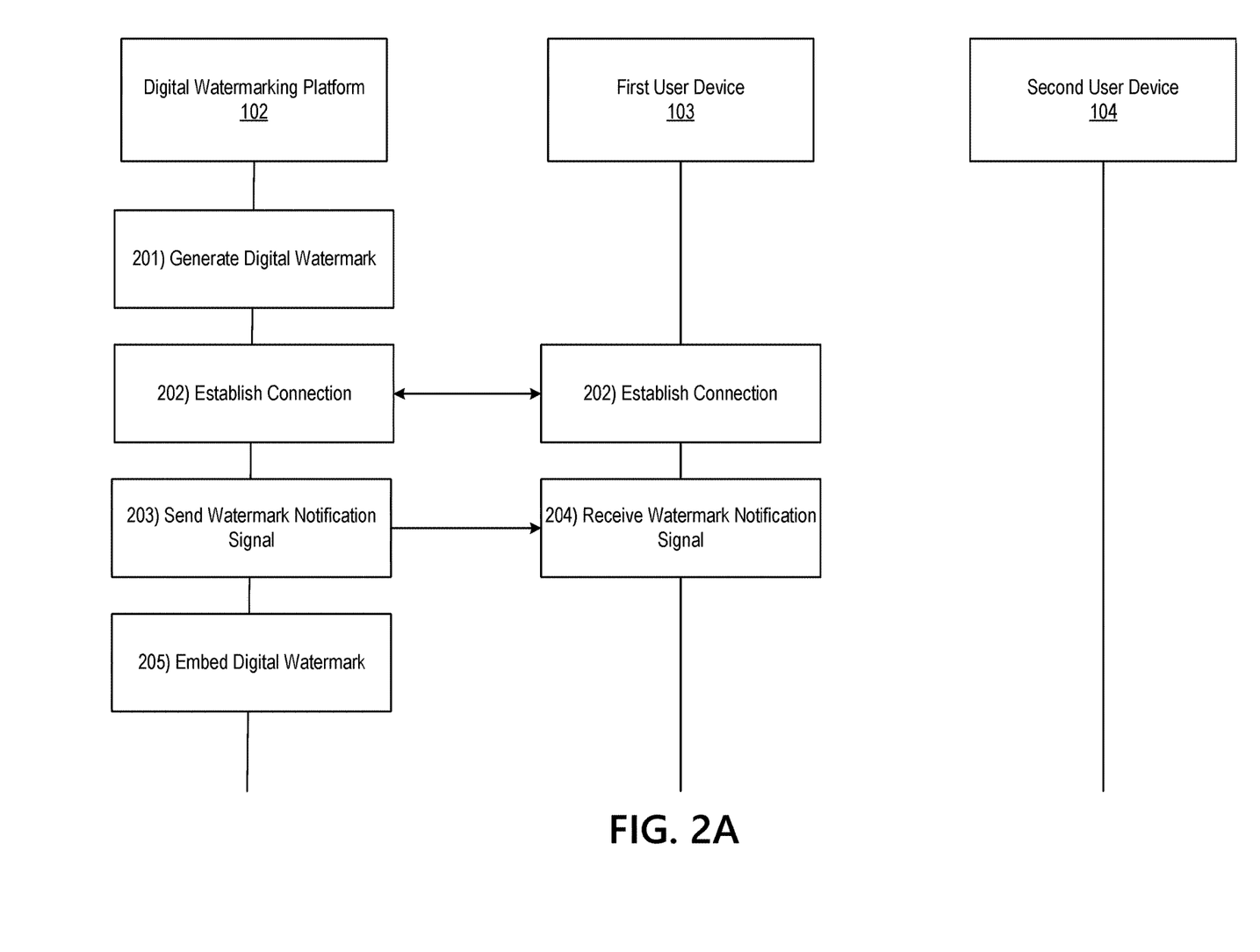
FIGS. 2A-2C depict an illustrative event sequence for embedding digital watermarks for automated vishing prevention in accordance with one or more example embodiments.
Figure 2B:
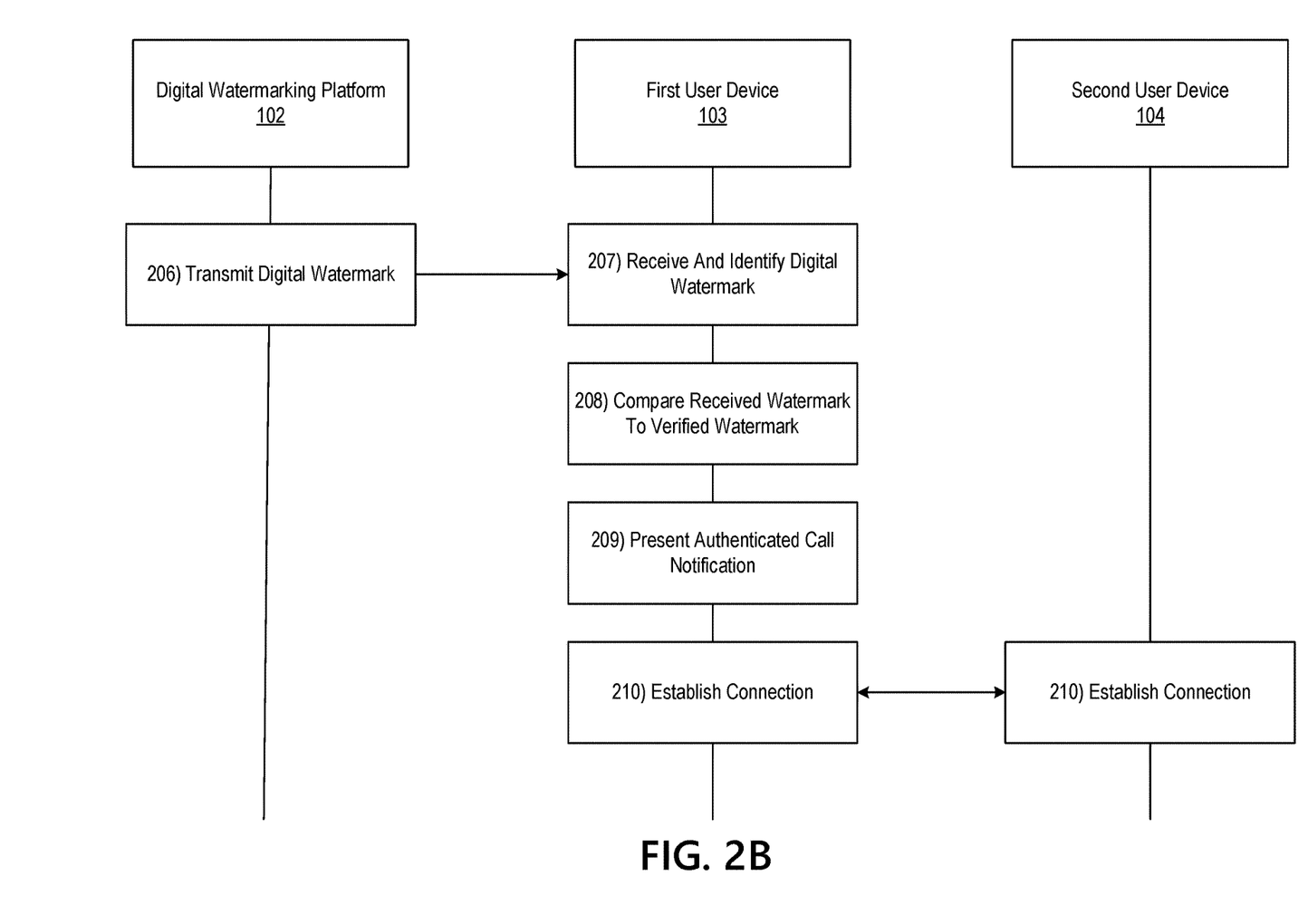
Figure 2C:
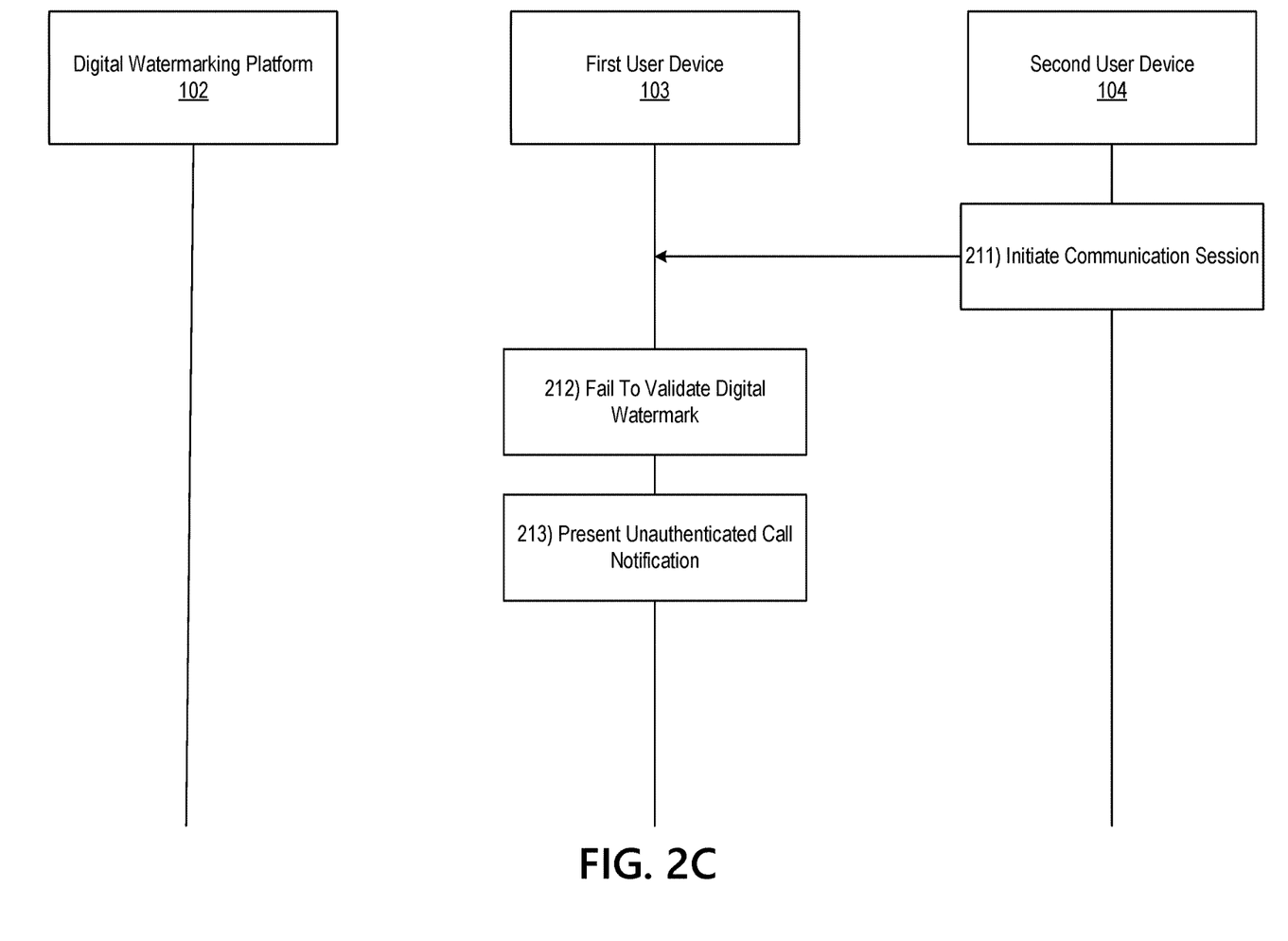

FIGS. 2A-2C depict an illustrative event sequence for embedding digital watermarks for automated vishing prevention in accordance with one or more example embodiments. Referring to FIG. 2A, at step 201, the digital watermarking platform 102 may generate a digital watermark. For example, the digital watermarking platform 102 may generate an audio signal, numeric value, hash value, and/or other watermark that may be embedded into communication sessions and/or requests to establish such sessions (e.g., at a particular frequency, within a particular frequency band, or the like). In some instances, in generating the digital watermark, the digital watermarking platform 102 may generate high frequency signals (e.g., 30-50 KHz, or the like), which might not be perceptible to human ears. In some instances, the digital watermarking platform 102 may generate digital watermarks on a user by user basis, such that a digital watermark transmitted to a first user might not match a digital watermark transmitted to a second user. This may, for example, prevent the use of the digital watermark, received by a malicious user, in deceiving a second user (e.g., by embedding the digital watermark in communications between the malicious user and the second user, or the like). In some instances, the digital watermarking platform 102 may associate a time to live (TTL) with a digital watermark, which may define a period of time after which the digital watermark expires and may be replaced by a subsequently generated digital watermark. Additionally or alternatively, the digital watermark may be configured for single use, and may expire/be replaced after a single transmission of the digital watermark. In some instances, the digital watermark may be representative of a valid identity of an individual or chatbot of an enterprise organization corresponding to the digital watermarking platform 102, or the like (e.g., represent a valid employee or bot identity, or the like).

At step 202, the digital watermarking platform 102 may establish a connection with the first user device 103. For example, the digital watermarking platform 102 may establish a first wireless data connection with the first user device 103 to link the digital watermarking platform 102 with the first user device 103 (e.g., in preparation for sending watermark notification signals and/or otherwise communicating). In some instances, the digital watermarking platform 102 may identify whether or not a connection is already established with the first user device 103. If a connection is already established with the first user device 103, the digital watermarking platform 102 might not re-establish the connection. Otherwise, if a connection is not yet established with the first user device 103, the digital watermarking platform 102 may establish the first wireless data connection as described herein.

At step 203, the digital watermarking platform 102 may send a watermark notification signal to the first user device 103. For example, the digital watermarking platform 102 may send a wake up and/or other signal to the first user device 103, which may include a verified version of the digital watermark, a frequency at which the verified version of the digital watermark is embedded, a frequency band of the frequency, and/or other information. In doing so, the digital watermarking platform 102 may configure an application at the first user device 103 to identify and validate the digital watermark once received. For example, the digital watermarking platform 102 may send the watermark notification signal to the first user device 103 via the communication interface 113 and while the first wireless data connection is established.

At step 204, the first user device 103 may receive the watermark notification signal sent at step 203. For example, the digital watermarking platform 102 may receive the watermark notification signal while the first wireless data connection is established. In these instances, the first user device 103 may store information from the watermark notification signal such as a verified version of the digital watermark, a frequency at which the verified version of the digital watermark is embedded, a frequency band of the frequency, and/or other information.

At step 205, the digital watermarking platform 102 may embed a digital watermark into a communication (e.g., requesting to initiate a communication session, as part of an existing communication session, or the like) between the digital watermarking platform 102 and the first user device 103. In some instances, this communication may have originated at another device (e.g., another user device, or the like) and may be routed to the first user device 103 via the digital watermarking platform 102. In some instances, in embedding the digital watermark in the communication, the digital watermarking platform 102 may embed the digital watermark at a first frequency. In some instances, each time a new or different digital watermark is embedded, it may be embedded the same or a different frequency. In some instances, the digital watermarking platform 102 may embed the digital watermark using frequency domain multiplexing. For example, the digital watermarking platform 102 may embed portions of the digital watermark at different frequencies, which may then be re-assembled on the client side. Additionally or alternatively, the digital watermarking platform 102 may embed the digital watermark using time domain multiplexing. For example, the digital watermarking platform 102 may embed portions of the digital watermark for communication to the first user device 103 at different times, which may then be re-assembled on the client side.

Referring to FIG. 2B, at step 206, once the digital watermark is embedded into the request for the communication session (or the communication session itself), the corresponding request/communication may be sent to the first user device 103. For example, the corresponding request/communication including the embedded digital watermark may be sent to the first user device 103 via the communication interface 113 and while the first wireless data connection is established. In some instances, as described above at step 205, the digital watermark may be sent using time and/or frequency domain multiplexing. In some instances, the digital watermark may be sent along a path to the first user device 103 that includes one or more intervening waypoints. In these instances, at least one of these intervening waypoints may modify the digital watermark, a frequency at which the digital watermark is embedded, modify the time and/or frequency domain multiplexing, and/or perform other actions with regard to the digital watermark. In such instances, these modifications may be previously known to the digital watermarking platform 102, and the digital watermarking platform 102 may have included information of such modifications in the watermark notification signal sent at step 203. Accordingly, the first user device 103 may be informed of a final digital watermark and/or location thereof (e.g., as transmitted to the first user device 103 by a final waypoint), despite the final digital watermark and/or location thereof being different than the digital watermark embedded at step 205 and/or the corresponding location. This may, e.g., enable the first user device 103 to access the digital watermark despite any modifications. In some instances, rather than communicating these modifications using the watermark notification signal sent at step 203, the modifications may be communicated to the first user device 103 by the waypoints themselves. In some instances, the digital watermarking platform 102 may send the digital watermark to the first user device 103 via the communication interface 113 and while the first wireless data connection is established. In some instances, in sending the digital watermark, the digital watermarking platform 102 may encrypt the digital watermark for enhanced security.

At step 207, the first user device 103 may receive and extract the digital watermark. For example, the first user device 103 may access a location of the digital watermark (e.g., a single frequency, multiple frequencies, multiple times, and/or other information), which may e.g., be stored at the first user device 103 based on the watermark notification signal and/or other signals from intervening waypoints. For any identified frequencies, the first user device 103 may perform frequency modulation within a frequency band corresponding to the identified frequencies to identify and subsequently extract the corresponding digital watermark (or a portion thereof). In instances where the digital watermark is distributed across the frequency and/or time domain, the first user device 103 may assemble the digital watermark accordingly. In instances where the digital watermark was encrypted by the digital watermarking platform 102, the first user device 103 may decrypt the digital watermark accordingly.

At step 208, the first user device 103 may compare the extracted and/or otherwise assembled digital watermark to the verified digital watermark received in the watermark notification signal. If the first user device 103 identifies that the extracted digital watermark matches the verified digital watermark, the first user device 103 may proceed to step 209. Otherwise, if the first user device 103 identifies that the extracted digital watermark does not match the verified digital watermark, the first user device 103 may proceed to step 213

Figure 5:
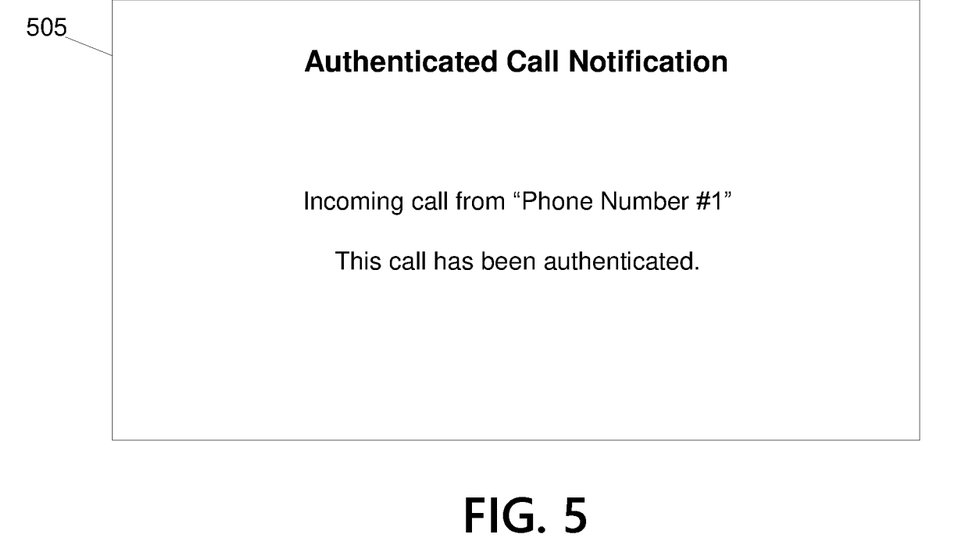
FIGS. 5 and 6 depict illustrative user interfaces for embedding digital watermarks for automated vishing prevention in accordance with one or more example embodiments.

At step 209, based on identifying that the extracted digital watermark matches the verified digital watermark, the first user device 103 may present an authenticated call notification. For example, the first user device 103 may cause display of a graphical user interface similar to graphical user interface 505, which is illustrated in FIG. 5. Additionally or alternatively, the identification that the extracted digital watermark matches the verified digital watermark may trigger the first user device 103 to modify a color of its interface (e.g., change to green, or the like), present haptic feedback, and/or otherwise indicate that the requested communication is authenticated.

While steps 201-209 refer to communications intercepted by and/or otherwise routed through the digital watermarking platform 102, steps 210-213 refer to communications between user devices that might not be intercepted by and/or otherwise routed through the digital watermarking platform 102, and thus might not include the watermark described above.

At step 210, the second user device 104 may establish a connection with the first user device 103. For example, the second user device 104 may establish a second wireless data connection with the first user device 103 to link the second user device 104 with the first user device 103 (e.g., in preparation for initiating communications). In some instances, the second user device 104 may identify whether a connection is already established with the first user device 103.

If a connection is already established with the first user device 103, the second user device 104 might not re-establish the connection. Otherwise, if a connection is not yet established with the first user device 103, the second user device 104 may establish the second wireless data connection as described herein.

Referring to FIG. 2C, at step 211, the second user device 104 may send a request to initiate a communication session with the first user device 103. For example, the second user device 104 may send the request to initiate the communication session while the second wireless data connection is established.

At step 212, the first user device 103 may fail to validate any digital watermark. For example, the first user device 103 may fail to identify the digital watermark because it might not have been instructed (e.g., by the digital watermarking platform 102) on where to find the digital watermark (e.g., at what frequency or the like). Additionally or alternatively, because the request to initiate the communication session was not routed through the digital watermarking platform 102, no digital watermark may have even been embedded into the request. In some instances, the first user device 103 may attempt to identify and/or otherwise validate a digital watermark in response to detecting language associated with activities of the digital watermarking platform 102 (e.g., language related to finance, banking, or the like).

Figure 6:
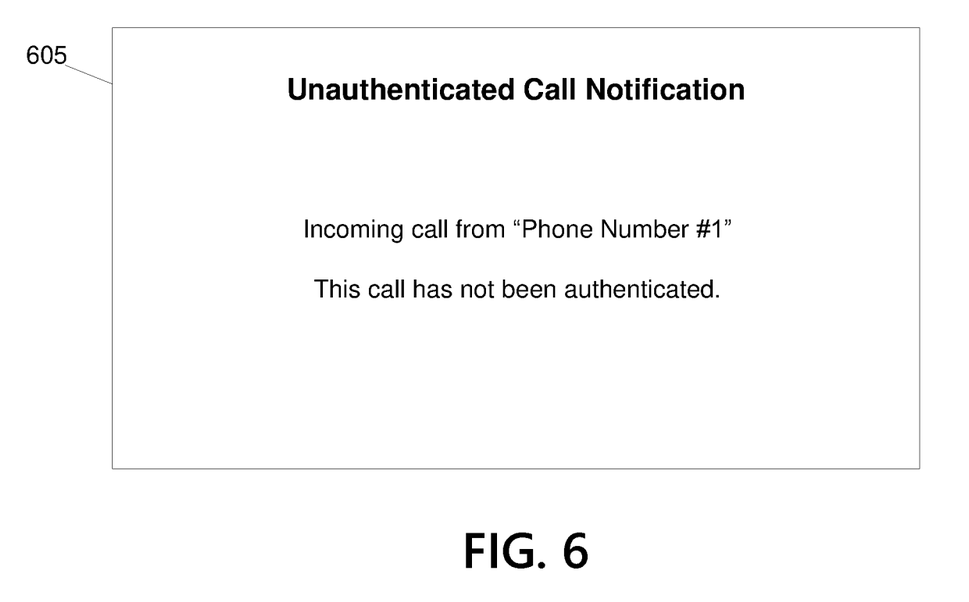

At step 213, based on a failure to identify and/or otherwise validate a digital watermark, the first user device 103 may present an unauthenticated call notification. For example, the first user device 103 may cause display of a graphical user interface similar to graphical user interface 605, which is illustrated in FIG. 6. Additionally or alternatively, the failure to identify and/or otherwise validate the digital watermark may trigger the first user device 103 to modify a color of its interface (e.g., change to red, or the like), present haptic feedback, and/or otherwise indicate that the requested communication is not authenticated. In some instances, the first user device 103 may additionally or alternatively automatically block the request for the communication session.

Although steps 201-213 describe the use of the digital watermarking on behalf of a particular enterprise, such techniques may be applied on behalf of any number of enterprises and/or individuals who may opt in to a watermarking service without departing from the scope of the disclosure.

Figure 3:
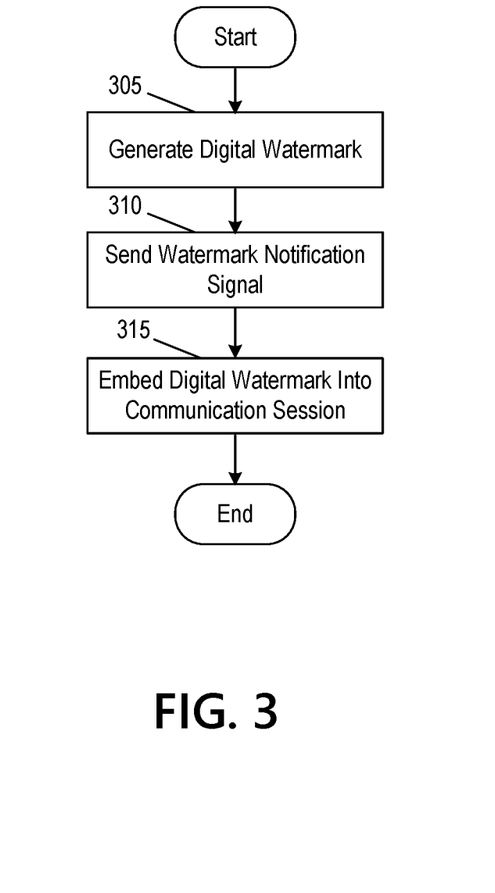
FIGS. 3 and 4 depict illustrative methods for embedding digital watermarks for automated vishing prevention in accordance with one or more example embodiments.

FIG. 3 depicts an illustrative method for embedding digital watermarks for automated vishing prevention in accordance with one or more example embodiments. At step 305, a computing platform having at least one processor, a communication interface, and memory may generate a digital watermark configured to validate an identity of a call initiator. At step 310, the computing platform may send a watermark notification signal, including a verified version of the digital watermark and a frequency at which the digital watermark will be embedded in a communication session and/or request, to a user device of a call recipient. At step 315, the computing platform may embed, into the communication session and/or request, the digital watermark, and may establish the session and/or send the request accordingly.

Figure 4:
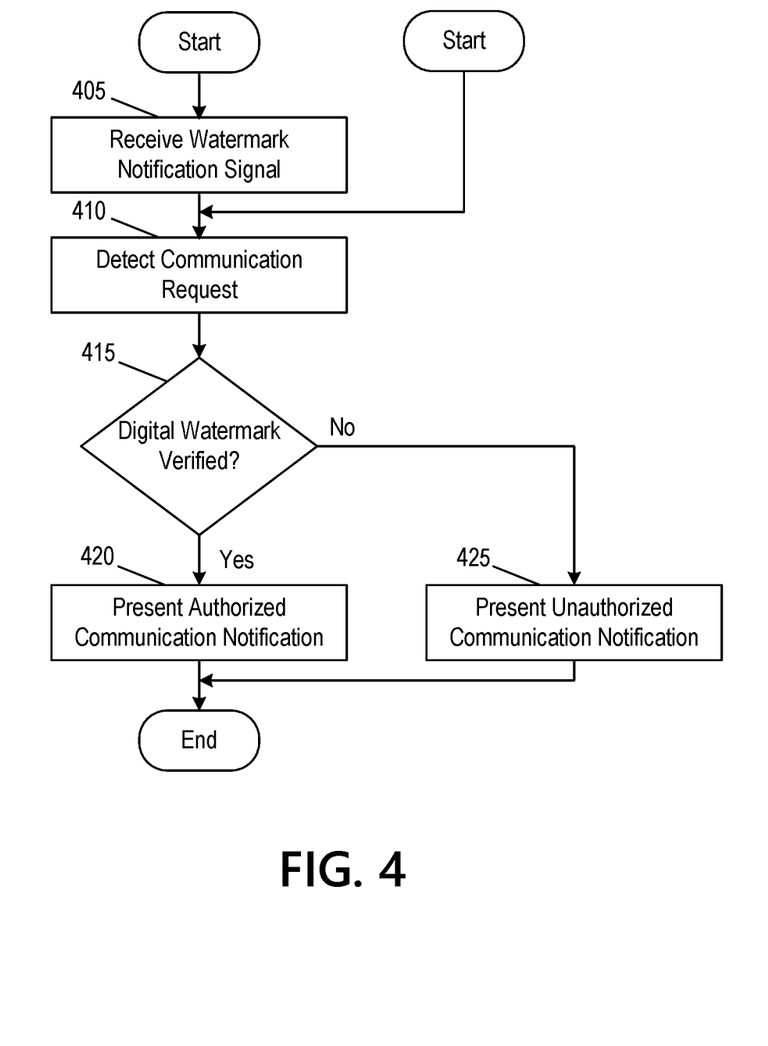

FIG. 4 depicts an illustrative method for embedding digital watermarks for automated vishing prevention in accordance with one or more example embodiments. At step 405, a computing device having at least one processor, a communication interface, and memory may receive a watermark notification signal. For example, the computing device may receive the watermark notification signal from a digital watermarking platform associated with validating call initiators. At step 410, the computing device may detect a communication request. As shown, in some instances, the computing device may receive a watermark notification signal in advance of the communication request. However, in other instances, the computing device might not receive such a signal. For example, in some instances, a user device and/or other device operated by an impersonator, implementing a deepfake, implementing a fraudulent chatbot, and/or otherwise may send the communication request, and accordingly, a watermark notification signal might not be received, as a watermark might not be embedded in the communication request. At step 415, the computing device may attempt to verify the digital watermark. If the computing device successfully verifies the digital watermark, the computing device may proceed to step 420. At step 420, the computing device may present an authorized communication notification.

Returning to step 415, if the computing device is unable to verify and/or otherwise identify the digital watermark, the computing device may proceed to step 425. At step 425, the computing device may present an unauthorized communication notification.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
generate a digital watermark configured to verify an identity of an initiator of a communication session, wherein the digital watermark comprises an audio signal, a number, and a hash value;
send, to a first user device comprising at least a second processor, a second communication interface, and second memory, a digital watermark signal, wherein the digital watermark signal comprises a wake up signal that indicates:
a validated digital watermark comprising the digital watermark,
a frequency at which the validated digital watermark is embedded,
and
information indicating modifications to be made to the digital watermark by each of a plurality of intervening waypoints through which the digital watermark is routed en route to the first user device, wherein sending the wake up signal configures an application executing on the first user device to identify and validate the digital watermark once received;
embed, into a request to initiate a communication session, the digital watermark; and
send, to the first user device, the request to initiate the communication session, wherein the request comprises portions of the digital watermark embedded at different times at a first frequency, wherein the first user device:
identifies, based on the wake up signal, the digital watermark embedded into the request to initiate the communication session, wherein the digital watermark is re-assembled based on the portions of the digital watermark embedded at the different times,
compares the digital watermark embedded into the request to initiate the communication session to the validated digital watermark,
based on identifying that the digital watermark embedded into the request to initiate the communication session matches the validated digital watermark, outputs an authenticated communication session notification, wherein:
sending the request to initiate the communication session comprises sending, via the plurality of intervening waypoints, the request to initiate the communication session,
the first frequency at which the portions of the digital watermark, embedded at different times, is modified at one or more of the plurality of intervening waypoints based on the information indicating the modifications included in the wake up signal, and the first frequency corresponds to a frequency at which the digital watermark is embedded at a final waypoint of the plurality of intervening waypoints; and based on identifying that the request to initiate the communication session does not include the digital watermark, initiating haptic feedback at the first user device.

2. The computing platform of claim 1, wherein the digital watermark is specific to a user of the first user device.

3. The computing platform of claim 1, wherein the digital watermark has a predetermined time to live (TTL).

4. The computing platform of claim 1, wherein the digital watermark is configured for one time use.

5. The computing platform of claim 1, wherein the digital watermark signal further includes a frequency band of the first frequency.

6. The computing platform of claim 1, wherein embedding the digital watermark comprises embedding the digital watermark at the first frequency.

7. The computing platform of claim 1, wherein embedding the digital watermark comprises embedding a first portion of the digital watermark at the first frequency and a second portion of the digital watermark at a second frequency, wherein the digital watermark signal further includes the second frequency.

8. The computing platform of claim 1, wherein sending the request to initiate the communication session comprises sending a first portion of the digital watermark at a first time and a second portion of the digital watermark at a second time, wherein the first user device is configured to assemble the digital watermark, using the first portion of the digital watermark and the second portion of the digital watermark, once both portions of the digital watermark are received.

9. The computing platform of claim 1, wherein identifying the digital watermark comprises performing frequency modulation at the first frequency and within a frequency band corresponding to the first frequency to detect the digital watermark.

10. The computing platform of claim 1, wherein the memory stores additional computer-readable instructions that, when executed by the at least one processor, further cause the computing platform to:

generate, after sending the request to initiate the communication session, a second digital watermark; and replace the digital watermark with the second digital watermark.

11. The computing platform of claim 1, wherein the first user device is configured to:

receive, from a second user device, a request to initiate a second communication session, identify that the request to initiate the second communication session does not include the digital watermark, and based on identifying that the request to initiate the second communication session does not include the digital watermark, trigger presentation of an unauthenticated communication session notification.

12. A method comprising: at a computing platform comprising at least one processor, a communication interface, and memory:

generating a digital watermark configured to verify an identity of an initiator of a communication session, wherein the digital watermark comprises an audio signal, a number, and a hash value;

sending, to a first user device, a digital watermark signal, wherein the digital watermark signal comprises a wake up signal that indicates:

a validated digital watermark comprising the digital watermark, a frequency at which the validated digital watermark is embedded, and information indicating modifications to be made to the digital watermark by each of a plurality of intervening waypoints through which the digital watermark is routed en route to the first user device, wherein sending the wake up signal configures an application executing on the first user device to identify and validate the digital watermark once received;

embedding, into a request to initiate a communication session, the digital watermark; and sending, to the first user device, the request to initiate the communication session, wherein the request comprises portions of the digital watermark embedded at different times at a first frequency, wherein the first user device is configured to:

identify, based on wake up signal, the digital watermark embedded into the request to initiate the communication session, wherein the digital watermark is re-assembled based on the portions of the digital watermark embedded at the different times, compare the digital watermark embedded into the request to initiate the communication session to the validated digital watermark, based on identifying that the digital watermark embedded into the request to initiate the communication session matches the validated digital watermark, output an authenticated communication session notification, wherein:

sending the request to initiate the communication session comprises sending, via the plurality of intervening waypoints, the request to initiate the communication session, the frequency at which the portions of the digital watermark, embedded at different times, is modified at one or more of the plurality of intervening waypoints based on the information indicating the modifications included in the wake up signal, and the frequency corresponds to a frequency at which the digital watermark is embedded at a final waypoint of the plurality of intervening waypoints; and based on identifying that the request to initiate the communication session does not include the digital watermark, initiating haptic feedback at the first user device.

13. The method of claim 12, wherein the digital watermark is specific to a user of the first user device.

14. The method of claim 12, wherein the digital watermark has a predetermined time to live (TTL).

15. The method of claim 12, wherein the digital watermark is configured for one time use.

16. One or more non-transitory computer-readable media storing instructions that, when executed by a computing platform comprising at least one processor, a communication interface, and memory, cause the computing platform to:

generate a digital watermark configured to verify an identity of an initiator of a communication session, wherein the digital watermark comprises an audio signal, a number, and a hash value;

send, to a first user device, a digital watermark signal, wherein the digital watermark signal comprises a wake up signal that indicates:
- a validated digital watermark comprising the digital watermark,
- a frequency at which the validated digital watermark is embedded, and
- information indicating modifications to be made to the digital watermark by each of a plurality of intervening waypoints through which the digital watermark is routed en route to the first user device, wherein sending the wake up signal configures an application executing on the first user device to identify and validate the digital watermark once received;

embed, into a request to initiate a communication session, the digital watermark; and send, to the first user device, the request to initiate the communication session, wherein the request comprises portions of the digital watermark embedded at different times at a first frequency, wherein the first user device is configured to:
- identify, based on the wake up signal, the digital watermark embedded into the request to initiate the communication session, wherein the digital watermark is re-assembled based on the portions of the digital watermark at the different times,
- compare the digital watermark embedded into the request to initiate the communication session to the validated digital watermark,
- based on identifying that the digital watermark embedded into the request to initiate the communication session matches the validated digital watermark, output an authenticated communication session notification, wherein:
  - sending the request to initiate the communication session comprises sending, via the plurality of intervening waypoints, the request to initiate the communication session,
  - the first frequency at which the portions of the digital watermark, embedded at different times, is modified at one or more of the plurality of intervening waypoints based on the information indicating the modifications included in the wake up signal, and
  - the first frequency corresponds to a frequency at which the digital watermark is embedded at a final waypoint of the plurality of intervening waypoints; and
- based on identifying that the request to initiate the communication session does not include the digital watermark, initiating haptic feedback at the first user device.

17. The one or more non-transitory computer-readable media of claim 16, wherein the digital watermark is specific to a user of the first user device.

18. The one or more non-transitory computer-readable media of claim 16, wherein the digital watermark has a predetermined time to live (TTL).

19. The one or more non-transitory computer-readable media of claim 16, wherein the digital watermark is configured for one time use.

* * * * *